(12) United States Patent
Marston

(10) Patent No.: US 11,832,685 B2
(45) Date of Patent: Dec. 5, 2023

(54) FLUID ENHANCED FOOTWEAR

(71) Applicant: Jez Milton John Marston, Laurel, MD (US)

(72) Inventor: Jez Milton John Marston, Laurel, MD (US)

(*) Notice: Subject to any disclaimer, the term of this patent is extended or adjusted under 35 U.S.C. 154(b) by 140 days.

(21) Appl. No.: 17/073,335

(22) Filed: Oct. 17, 2020

(65) Prior Publication Data
US 2021/0112919 A1   Apr. 22, 2021

Related U.S. Application Data

(60) Provisional application No. 62/973,651, filed on Oct. 18, 2019.

(51) Int. Cl.
| | |
|---|---|
| *A43B 13/18* | (2006.01) |
| *A43B 3/12* | (2006.01) |
| *A43B 1/12* | (2006.01) |
| *A43B 1/00* | (2006.01) |
| *A43B 3/36* | (2022.01) |

(52) U.S. Cl.
CPC .......... *A43B 13/189* (2013.01); *A43B 1/0072* (2013.01); *A43B 1/12* (2013.01); *A43B 3/128* (2013.01); *A43B 3/36* (2022.01)

(58) Field of Classification Search
CPC ........ A43B 13/189; A43B 3/128; A43B 13/20
USPC .......................................................... 36/28
See application file for complete search history.

(56) References Cited

U.S. PATENT DOCUMENTS

| | | | | |
|---|---|---|---|---|
| 3,273,264 | A * | 9/1966 | Farinello, Jr. ............ | A43B 7/06 |
| | | | | D2/964 |
| 9,468,252 | B2 | 10/2016 | Dimatteo | |
| 2004/0118831 | A1 | 6/2004 | Martin | |
| 2011/0192053 | A1 | 8/2011 | Beers | |
| 2012/0199222 | A1 | 8/2012 | Sullivan et al. | |
| 2013/0125416 | A1* | 5/2013 | Hoffer .................... | A43B 13/22 |
| | | | | 36/83 |
| 2013/0283640 | A1 | 10/2013 | Elder et al. | |

(Continued)

OTHER PUBLICATIONS

'These Sneakers are made of Garbage' (Gabi), Apr. 9, 2019 (Apr. 9, 2019), [online], retrieved from <URL: https://myhappyfootprint.corn/these-sneakers-are-made-of-garbage/>.

(Continued)

*Primary Examiner* — Timothy K Trieu

(57) ABSTRACT

A footwear including an outsole portion; an insole portion, wherein an upper surface area of the midsole portion being operable for contacting a wearer's foot; a midsole section, the midsole section is disposed between the outsole portion and upper or strap portion, wherein the midsole section is configured to be operable for absorbing a shock imposed on the footwear; a predetermined amount of fluid; a fluid compartment disposed in the midsole section, wherein the fluid compartment is configured to house the predetermined amount of fluid, in which a perimeter area around the fluid-filled compartment comprises a translucent or clear material, and wherein the housed fluid can be seen or observed through the compartment; and in which an upper surface area of the fluid-filled compartment that is into engagement with a top layer of the midsole portion comprises a pliable material that is configured to stretch under pressure.

19 Claims, 3 Drawing Sheets

(56) References Cited

U.S. PATENT DOCUMENTS

2016/0074547 A1* 3/2016 Dobrinsky ............. A43B 17/10
   250/492.1
2016/0295965 A1* 10/2016 Hensley ................. A43B 13/20
2016/0366972 A1 12/2016 Wilken et al.
2021/0112919 A1 4/2021 Marston

OTHER PUBLICATIONS

EL (Electroluminescent) Wire FAQs' (NTE Electronics INC), Oct. 5, 2019 (Oct. 5, 2019),[online], retrieved from <URL:http://web.archive.org/web/20191005035435/http:/twww.nteinc.com/LED_tubing/EL wire_faqs.php>.

* cited by examiner

FLUID ENHANCED FOOTWEAR

CROSS-REFERENCE TO RELATED APPLICATIONS

The present Utility patent application claims priority benefit of the U.S. provisional application for patent Ser. No. 62/973,651 entitled "Fluid or Water-Filled Shoe or Sandal Lower and Upper", filed on Oct. 18, 2019, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to footwear. More particularly, certain embodiments of the invention relate to fluid enhanced footwear for increased comfort through incorporation of an intermediate layer of liquid.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. The use of proper footwear may have a plethora of positive effects, including, but not limited to, improved posture and circulation, prevention of foot pain, increased comfort, etc. In order to increase cushioning and support of the wearer's foot, conventional footwear may incorporate foam cushioning into one or more of the sole, midsole, and heel of the sandal or shoe. Such cushioning may be readily compressed and decompressed, which may decrease the amount of impact a user may experience with each step the user takes. As a large portion of the day to day activity of an average individual may be spent on their feet, any slight increase in comfort may have significant lifestyle benefits.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that in addition to conventional foam cushioning, modern footwear may improve overall comfort with the incorporation of air, liquid, or gel into the heel of a shoe or sandal. Conventional modern footwear may include a barrier of thick or rigid material between the compartment that holds the gel or liquid in the heel and the wearer's foot, which may prevent a user from directly experiencing the sensation of these elements underneath the user's foot. While a large part of modern innovation in the field of footwear may be focused on increasing the comfort of shoes and sandals, few advancements have been made in changing the overall experience and feel of walking. While different footwear may have a variety of different options for types of cushioning and support, the overall experience of using conventional footwear may be similar when comparing different styles of shoes. Further, the uppers of shoes and upper straps of sandals typically incorporate thin layers of materials such as, without limitation, cloth, rubber, plastic, leather, etc. While such materials may be adequate for securing the shoe or sandal to a user's foot and offering a degree of protection, there may not be any additional functionality.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
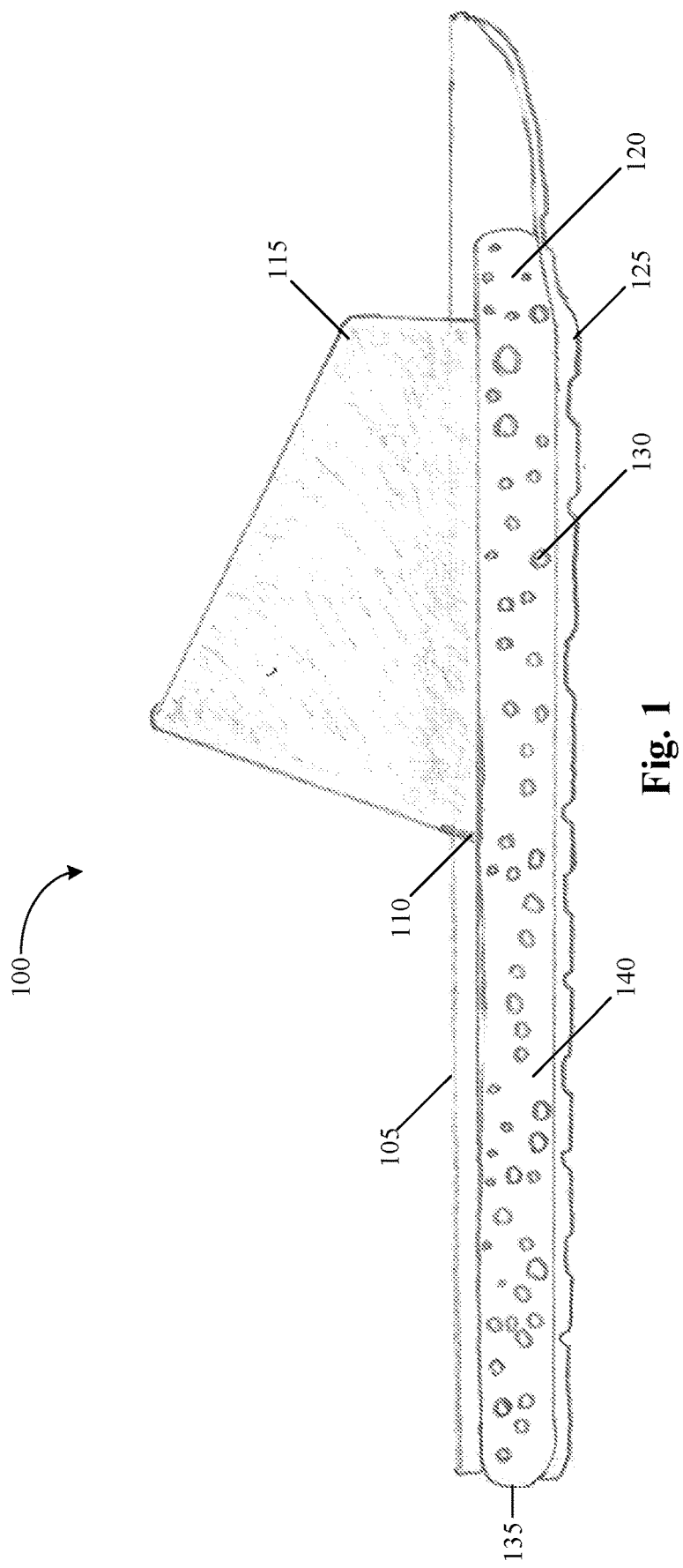
FIG. 1 illustrates a side view of an exemplary fluid enhanced footwear, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

With reference to the following embodiments, a "sole" may be described as the lower portion of a shoe that can include the "midsole", "outsole" and/or "heel". A "heel" may be described as a back portion of the shoe's lower and/or underside only. A "midsole" may be described as a layer of material between the outsole and "upper" of a shoe, typically for absorbing shock. An "outsole" may be described as the outermost layer of the bottom of a shoe, typically the tread of a shoe. An "upper" may be described as the upper portion of the shoe above the midsole. A "strap" may be described as the upper portion of typically a sandal type shoe which may help to affix the sandal to a user's feet while also providing a degree of protection.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter.

To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hollinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially"

eliminated and for the intended purpose, it is believed that the slight portion of the film which may remain is negligible. We are of the view, therefore, that the claims may be regarded as sufficiently accurate." Similarly, *In re Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

FIG. 1 illustrates a side view of an exemplary fluid enhanced footwear device, in accordance with an embodiment of the present invention. Fluid enhanced footwear 100 may comprise, but not limited to, sandals, shoes, boots, etc. Fluid enhanced footwear 100 may include midsole section 135 between outsole portion 125 and top layer of midsole or fluid-filled compartment 105, midsole section 135 comprising fluid compartment 120 to provide for additional comfort and a unique walking experience for a user. Outsole portion 125 may comprise the outermost layer of the footwear, which may include the tread of footwear 100. Top layer of midsole or fluid-filled compartment 105 may include an upper portion of footwear 100 above midsole section 135. Fluid compartment 120 may comprise of a translucent material that is configured to house water or fluid. While conventional footwear may use a thick or rigid material as the top layer of the midsole, at least one of top layer of midsole or fluid compartment 105 and fluid compartment 120 of fluid enhanced footwear 100 may be composed of a pliable material such as, without limitation, silicone, silicone rubber, nitrile rubber, butyl rubber, etc., to enable the feet of the wearer to slightly sink into top layer of midsole or fluid-filled compartment 105 and feel a sensation of fluid underneath. Such pliable material may also be resilient enough to prevent leakage of fluid compartment 120 and withstand day to day use. The sensation of walking using fluid enhanced footwear 100 may be similar to stepping on, for example, without limitation, a water balloon, which may provide additional comfort to the user and dissipate shock throughout midsole section 135 of fluid enhanced footwear 100. In the absence of pressure or weight placed on fluid enhanced footwear 100, fluid compartment 120 of midsole section 135 may retain its original shape, which may prevent the deformation of top layer of midsole or fluid-filled compartment 105 and midsole section 135. Because the material surrounding fluid 140 may be composed of a thin, pliable material, pressure from a wearer's foot may stretch the material causing the wearer's foot to slightly sink into top layer of midsole or fluid-filled compartment 105 so that the foot of the wearer may maintain close contact with fluid 140 while still retaining fluid 140. Additionally, the elasticity of the material surrounding fluid 140 and top layer of midsole or fluid-filled compartment 105 may vary depending on the desires of the user. For example, without limitation, greater elasticity may create a softer feel, while less elasticity will provide for more firmness between the foot of the wearer and fluid 140. While the upper portion of fluid compartment 120 may be composed of the pliable material, the remaining portions (i.e. the sides and the bottom) of fluid compartment 120 may be composed of a sturdier material such as, without limitation, rubber, plastic, etc. to prolong the overall longevity of fluid enhanced footwear 100. Additionally, fluid compartment 120 may be composed of a different material than top layer of midsole or fluid-filled compartment 105, and top layer of midsole or fluid-filled compartment 105 may be composed of the pliable material. In the preferred embodiment, when the upper portion of fluid compartment 120 may be composed of the pliable material, fluid compartment 120 may be placed in its own form fitting slot or compartment above outsole 125 and beneath the wearer's foot within midsole section 135. That is, a bottom portion of fluid compartment 120 may be glued or affixed to outsole 125 so fluid compartment 120 may remain in place while the pliable material of an upper portion of fluid compartment 120 may stretch under pressure from the foot of a wearer. Alternatively, fluid compartment 120 may be separate from midsole section 135 altogether, wherein fluid compartment 120 may be affixed on top of midsole section 135 and in direct contact with the wearer's foot. Additionally, strap implement 115 may be hollow and connected to midsole section 135 such that fluid may pass through channel area 110 into and out of strap implement 115 from fluid compartment 120. Therefore, fluid 140 may freely flow throughout fluid enhanced footwear 100. Alternatively, strap implement 115 may contain a separate fluid container such that no fluid 140 may flow between strap implement 115 and fluid compartment 120. As such, strap implement 115 and fluid container 120 may be separately filled with fluid 140, and fluid 140. Alternatively, strap implement 115 may be filled with fluid 140 while midsole section 135 may not contain fluid 140 or fluid compartment 120.

Top layer of midsole or fluid-filled compartment 105 may be composed of the pliable material and attached to an upper perimeter of fluid compartment 135 such that top layer of midsole or fluid-filled compartment 105 may stretch under the foot of a wearer and create more direct contact between the wearer's foot and fluid 140. As will be appreciated by one skilled in the art, while one fluid compartment 120 may be shown, a greater number of separate fluid compartments may be used throughout fluid enhanced footwear 100. For example, without limitation, a separate fluid compartment may be used in the heel of fluid enhanced footwear 100, while a main fluid compartment may be used for the remaining area within midsole section 135. In the preferred embodiment, fluid enhanced footwear 100 may be composed of a translucent or transparent material such as, without limitation, plastic, silicon, vinyl, rubber, etc. such that fluid 140 may be visible throughout fluid enhanced footwear 100, including within strap implement 115. Because a transparent or translucent material may be used, fluid 140 may be visible when looking from the top of fluid enhanced footwear 100 through top layer of midsole or fluid-filled compartment 105, from the bottom through outsole 125, and from the side through midsole section 135. Alternatively, sections of fluid enhanced footwear 100 may be opaque while other sections of fluid enhanced footwear 100 may be transparent or translucent. For example, without limitation, outsole 125 may be completely transparent or translucent, may be mostly opaque with a transparent or translucent cut out section, or may be completely opaque. In some embodiments, outsole 125 may comprise of, but not limited to, rubber soles, lugged soles, Christy soles, etc. Rubber soles are made of, not a limitation, organic or recycled rubber that are flexible, waterproof and long-lasting and may withstand daily wear and tear. The rubber soles may be designed for different shoe styles, and not limited to, formal shoes to hiking boots. Lugged soles are made of, not a limitation, rubber and provide great traction and weather resistance and are ideal for rough or slippery terrain or places where extra protection is required such as work areas. Christy soles are made of, not a limitation, blown rubber and have a ripple pattern, a lightweight sole that provides great traction and stability. However, Christy soles are not as hardy as lugged soles when it comes to facing rough terrain.

Optionally, objects 130 may be present within fluid compartment 120 of midsole section 135 and strap implement 115, flowing freely within fluid 140 and more easily showing the flow of fluid 140 within fluid enhanced footwear 100. Objects 130 may comprise, for example, without limitation, glitter, toy characters, bubbles, etc. In addition, a motorized fan may be embedded within or on fluid enhanced footwear 100 with direct access to fluid compartment 120 to circulate fluid 140 throughout fluid enhanced footwear 100, independent of whether or not fluid enhanced footwear 100 is worn by a user. The fan may be operated by, for example, without limitation, a pressure switch or manual switch embedded within the material of fluid enhanced footwear 100. The fan may be powered by various means, such as, without limitation, rechargeable batteries, replaceable batteries, etc. Additionally, lighting may be incorporated within fluid enhanced footwear 100 such that fluid compartment 120 and other transparent or translucent surfaces within fluid enhanced footwear 100 may be illuminated. For example, without limitation, light emitting diodes (LEDs) may be incorporated within translucent or transparent lighting compartments that run parallel to the sole of fluid enhanced footwear 100 and separated from fluid compartment 120 via a translucent or transparent waterproof barrier. The LEDs may be activated, for example, without limitation, manually via a switch embedded into fluid enhanced footwear 100, via a pressure sensor, etc. Similarly, LEDs may be incorporated within strap implement 115 such that fluid 140 within strap implement 115 may be illuminated. LEDs within strap implement 115 may be contained within a compartment separate from fluid 140.

In an alternative embodiment, fluid compartment 120 may not fill the entirety of the midsole section 135, but rather, in a separate compartment from the remainder of the midsole, run along the perimeter of midsole section 135 such that a similar visual effect may be achieved while fluid enhanced footwear 100 may be lighter in weight as a lesser amount of fluid 120 may be present.

As will be appreciated by one skilled in the art, while fluid enhanced footwear 100 may be shown in the form of a sandal, alternative types of footwear may also utilize fluid compartment 120 within the sole of the footwear. For example, without limitation, shoes, boots, clogs, etc. may incorporate fluid compartment 120 within the sole of the footwear. Additionally, similar to strap implement 115 of fluid enhanced footwear 100, alternative footwear may include a transparent or translucent upper such that fluid may flow between the fluid compartment within the sole of the footwear into the upper of the footwear, for example, without limitation, upper 305 shown by way of example in FIG. 3.

Figure 2:
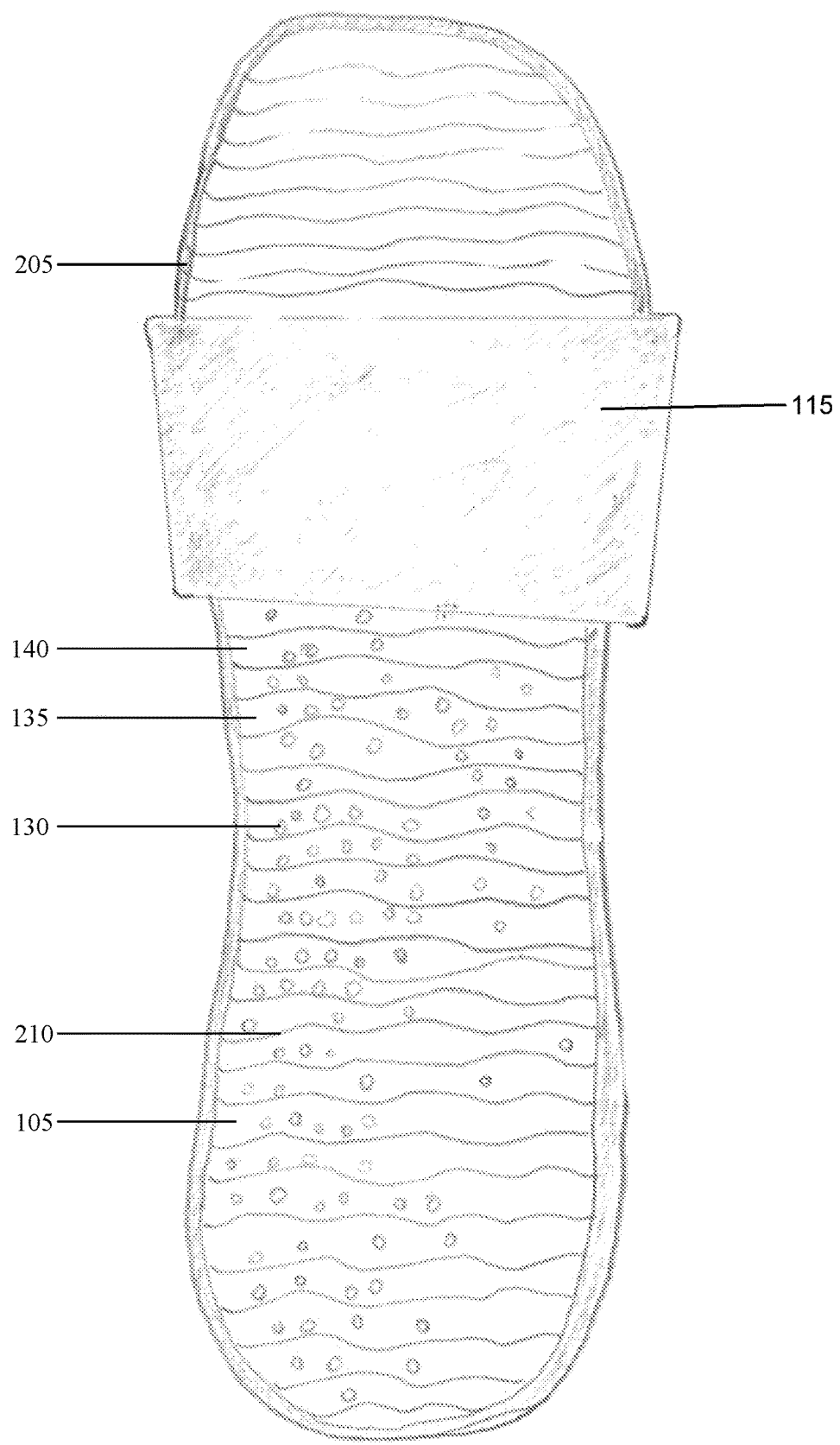
FIG. 2 illustrates a top view of an exemplary fluid enhanced footwear, in accordance with an embodiment of the present invention.

FIG. 2 illustrates a top view of an exemplary fluid enhanced footwear, in accordance with an embodiment of the present invention. With reference to both FIG. 1 and FIG. 2, fluid 140 and objects 130 may be dispersed throughout midsole section 135 so that the entirety of the foot of the wearer may be in contact with fluid 140. To prevent the foot of the wearer from sliding around fluid enhanced footwear 100, top layer of midsole or fluid-filled compartment 105 may have ridges 210 for improved traction between the wearer's foot and fluid enhanced footwear 100. Additionally, illumination may be dispersed throughout fluid enhanced footwear 100 via LEDs incorporated within a compartment separate from fluid 140 along perimeter 205 of fluid enhanced footwear 100.

In the preferred embodiment, fluid 140 may be, for example, a predetermined amount of water or fluid disposed in the fluid compartment to provide the user with additional comfort when compared to conventional footwear as well as provide for a unique feel when walking. However, as will be appreciated by one skilled in the art, fluid 120 may be any type of fluid, such as, without limitation, gel, etc. Additionally, dye may be used to color fluid 120 different colors, depending on the preference of the user.

Figure 3:
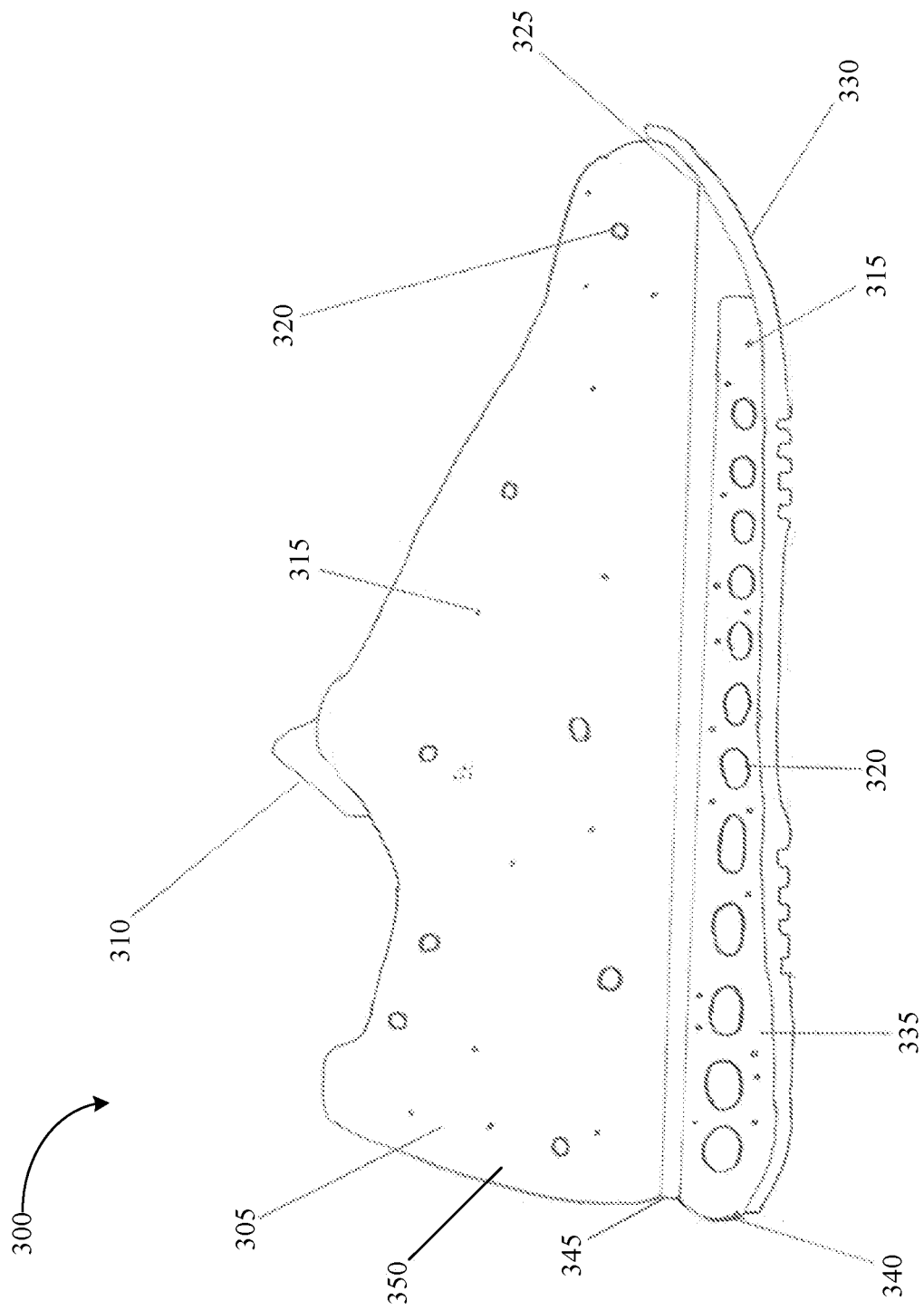
FIG. 3 illustrates a shoe version of an exemplary fluid enhanced footwear, in accordance with an embodiment of the present invention.

FIG. 3 illustrates a shoe version of an exemplary fluid enhanced footwear, in accordance with an embodiment of the present invention. While fluid enhanced footwear 100 may be a sandal version as shown in FIGS. 1-2, fluid enhanced footwear 100 may also be a shoe version 300, as shown in FIG. 3. Shoe version 300 may comprise upper 305, outsole 330, midsole 340, and top layer of midsole or fluid-filled compartment 345. In the preferred embodiment, fluid 350 may be distributed throughout upper 305 and fluid compartment 335 of midsole 340 to provide increased comfort to the wearer. Fluid 350 may flow between upper 305 and fluid compartment 335 via channel 325 such that fluid 350 may be distributed throughout shoe version 300. However, as will be appreciated by one skilled in the art, there may be no channel between fluid compartment 335 and upper 305 such that fluid may not flow between upper 305 and fluid compartment 335, and each of upper 305 and fluid compartment 335 may contain a separate amount of fluid 350. Additionally, at least one of fluid compartment 335 and upper 305 may be fluid-filled. That is, upper 305 may not contain fluid 350 while fluid compartment 335 may contain fluid 350, upper 305 may contain fluid 350 while fluid compartment 335 may not contain fluid 350, or both upper 305 and fluid compartment 335 may contain fluid 350. To create a unique feel and enhance comfort for a wearer, top layer of midsole or fluid filled compartment 345 may be composed of a pliable material such that a foot of the wearer may sink into fluid compartment 335 of midsole 340 and make more direct contact with fluid 350. Top layer of midsole or fluid filled compartment 345 may be composed of, for example, without limitation, silicone, silicone rubber, nitrile rubber, butyl rubber, etc. Additionally, various decorative elements may be incorporated within shoe version 300. For example, without limitation, objects 315 may be incorporated within fluid 350 such that the flow of fluid 350 may be more visible. Objects 315 may be, for example, without limitation, glitter, toy characters, bubbles, etc. In addition, illuminating devices 320 may provide an additional aesthetic enhancement to shoe version 300. Illuminating devices 320 may be, for example, without limitation, LEDs, and may be powered via a power element stored in compartment 310. The power element may be, for example, without limitation, rechargeable batteries, replaceable batteries, etc. While objects 315 may be fee floating in fluid 350 and illuminating devices 320 may be contained within a separate compartment, objects 315 and illuminating devices 320 may also be statically suspended within fluid 350 or incorporated into the material of shoe version 300 itself.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing fluid enhanced footwear according to the present invention will be apparent to those skilled in the art. Various aspects of the invention have been described above by way of illustration, and the specific embodiments disclosed are not intended to limit the invention to the particular forms disclosed. The particular implementation of the fluid enhanced footwear may vary depending upon the particular context or application. By way of example, and not limitation, the fluid enhanced footwear described in the foregoing were principally directed to footwear implementations; however, similar techniques may instead be applied to fluid enhanced accessories, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre AIA) or 35 USC 112(f) post-AIA. Otherwise, no limitations from the specification are to be read into any claims, unless those limitations are expressly included in the claims.

What is claimed is:

1. A footwear comprising:
   an outermost layer of said footwear, wherein an outermost bottom layer comprises an outsole portion;
   a midsole portion, wherein a top layer surface area of said midsole portion being configured to be operable for contacting a wearer's foot;
   a midsole section, said midsole section is disposed between said outsole portion and said top layer surface area, wherein said midsole section is configured to be operable for absorbing a shock imposed on said footwear;
   a predetermined amount of fluid;
   a fluid-filled compartment disposed in said midsole section, wherein said fluid-filled compartment is configured to house said predetermined amount of fluid, wherein a perimeter area around said fluid compartment comprises a translucent or clear material, and wherein the housed is observable through said compartment;
   wherein an upper surface area of said fluid-filled compartment that is engaged with said top layer surface area of said midsole portion comprises a pliable material that is configured to stretch under pressure;
   wherein said outsole portion comprises a tread made from at least one of, organic rubber, recycled rubber, and blown rubber that is configured to provide traction and stability;
   wherein said footwear comprises a sandal, wherein said sandal comprises a strap implement that is engaged with said midsole section; and
   wherein said strap implement comprises a hollow portion that is configured to hold fluid, and wherein said strap implement comprises a hollow portion that is configured to hold or pass fluid from said fluid-filled compartment in said midsole section.

2. The footwear of claim 1, wherein said fluid-filled compartment is further configured to house objects.

3. The footwear of claim 1, further comprising a motorized fan that is configured to circulate the water or fluid within said fluid-filled compartment.

4. The footwear of claim 1, further comprising at least one or more translucent or transparent lighting compartments disposed in said midsole section.

5. The footwear of claim 4, further comprising at least one or more translucent or transparent waterproof barriers that are configured to separate said fluid-filled compartment from said one or more lighting compartments, further comprising at least one or more light producing device incorporated within said one or more translucent or transparent compartments, wherein said one or more light producing device being configured to provide illumination.

6. The footwear of claim 1, further comprising at least one or more translucent or transparent waterproof barriers that are configured to separate said hollow portion in said strap implement from one or more translucent or transparent lighting compartments, further comprising at least one or more light producing device incorporated within said one or more translucent or transparent lighting compartments.

7. The footwear of claim 1, wherein said upper surface area of said midsole portion comprises a plurality of ridges, said plurality of ridges being configured to be operable for improving traction between the wearer's foot and said top layer surface area of said insole portion, and wherein an upper portion of said midsole portion is made to be translucent or transparent.

8. The footwear of claim 1, further comprising an upper implement, wherein said upper implement comprises a hollow portion that is configured to hold fluid, and wherein said upper implement comprises a hollow portion that is configured to hold or pass fluid from said fluid-filled compartment in said midsole section.

9. The footwear of claim 8, further comprising at least one or more translucent or transparent waterproof barriers that are configured to separate said hollow portion in said upper implement from one or more translucent or transparent lighting compartments, further comprising at least one or more light producing device incorporated within said one or more translucent or transparent lighting compartments.

10. The footwear of claim 1, wherein said fluid-filled compartment comprises at least one or more translucent or transparent fluid-filled compartments, and in which said fluid-filled compartment comprises at least one or more predetermined amount of colored fluids disposed in said one or more translucent or transparent fluid-filled compartments.

11. A foot wear comprising:
an outermost layer of said footwear, wherein an outermost bottom layer comprises an outsole portion;
a midsole portion, wherein a top layer surface area of said midsole portion being configured to be operable for contacting a wearer's foot;
a midsole section, said midsole section is disposed between said outsole portion and said top layer surface area, wherein said midsole section is configured to be operable for absorbing a shock imposed on said footwear;
wherein said footwear comprises a sandal, wherein said sandal comprises a strap implement that is engaged with said midsole section;
a predetermined amount of fluid;
a fluid-filled compartment disposed in said midsole section, wherein said fluid-filled compartment is configured to house said predetermined amount of fluid, wherein a perimeter area around said fluid compartment comprises a translucent or clear material, and wherein the housed fluid is observable through said compartment;
wherein an upper surface area of said fluid-filled compartment that is engaged with said top layer surface area of said midsole portion comprises a pliable material that is configured to stretch under pressure; and
a motorized fan that is configured to circulate the fluid within said fluid-filled compartment.

12. The footwear of claim 11, wherein said fluid-filled compartment is further configured to house objects.

13. The footwear of claim 11, further comprising at least one or more translucent or transparent lighting compartments disposed in said midsole section.

14. The footwear of claim 13, further comprising at least one or more translucent or transparent waterproof barriers that are configured to separate said fluid-filled compartment from said one or more lighting compartments, further comprising at least one or more light producing device incorporated within said one or more translucent or transparent compartments, wherein said one or more light producing device being configured to provide illumination.

15. The footwear of claim 11, wherein said strap implement comprises a hollow portion that is configured to hold fluid, and wherein said strap implement comprises a hollow portion that is configured to hold or pass fluid from said fluid-filled compartment in said midsole section.

16. The footwear of claim 15, further comprising at least one or more translucent or transparent waterproof barriers that are configured to separate said hollow portion in said strap implement from one or more translucent or transparent lighting compartments, further comprising at least one or more light producing device incorporated within said one or more translucent or transparent lighting compartments.

17. The footwear of claim 11, wherein said upper surface area of said midsole portion comprises a plurality of ridges, said plurality of ridges being configured to be operable for improving traction between the wearer's foot and said top layer surface area of said insole portion, and wherein an upper portion of said midsole portion is made to be translucent or transparent.

18. The footwear of claim 11, further comprising an upper implement, wherein said upper implement comprises a hollow portion that is configured to hold fluid, and wherein said upper implement comprises a hollow portion that is configured to hold or pass fluid from said fluid-filled compartment in said midsole section.

19. The footwear of claim 18, further comprising at least one or more translucent or transparent waterproof barriers that are configured to separate said hollow portion in said upper implement from one or more translucent or transparent lighting compartments, further comprising at least one or more light producing device incorporated within said one or more translucent or transparent lighting compartments.

* * * * *